J. D. OVENS.
SHOCK ABSORBER FOR VEHICLES.
APPLICATION FILED OCT. 2, 1915.

1,200,756.

Patented Oct. 10, 1916.
2 SHEETS—SHEET 1.

Inventor
JOHN D. OVENS

By Watson E. Coleman
Attorney

J. D. OVENS.
SHOCK ABSORBER FOR VEHICLES.
APPLICATION FILED OCT. 2, 1915.
1,200,756.
Patented Oct. 10, 1916.
2 SHEETS—SHEET 2.
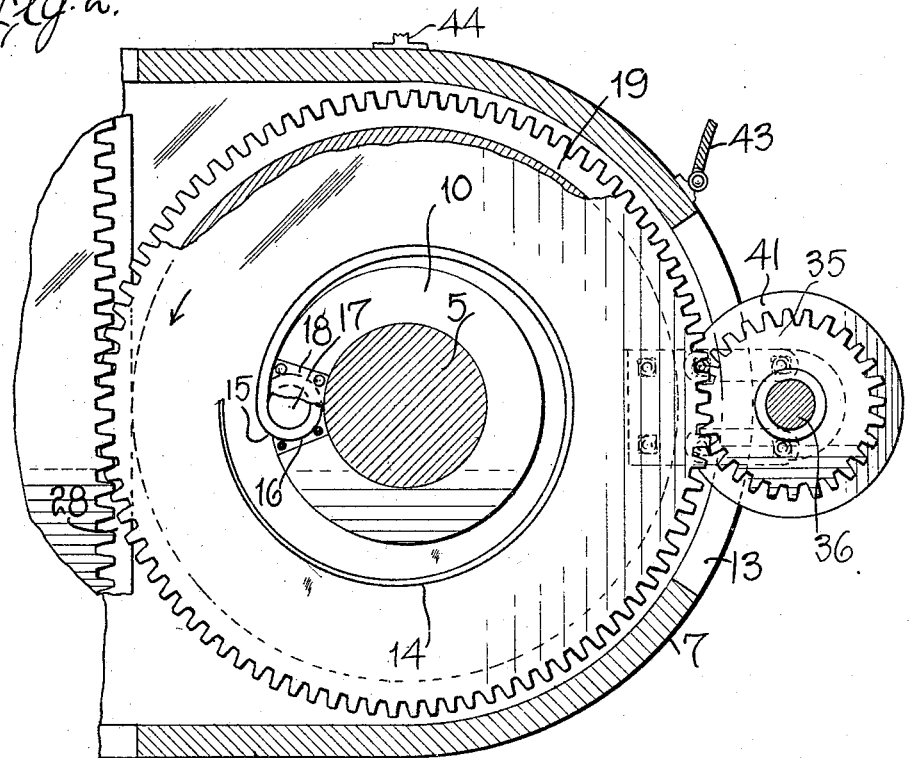
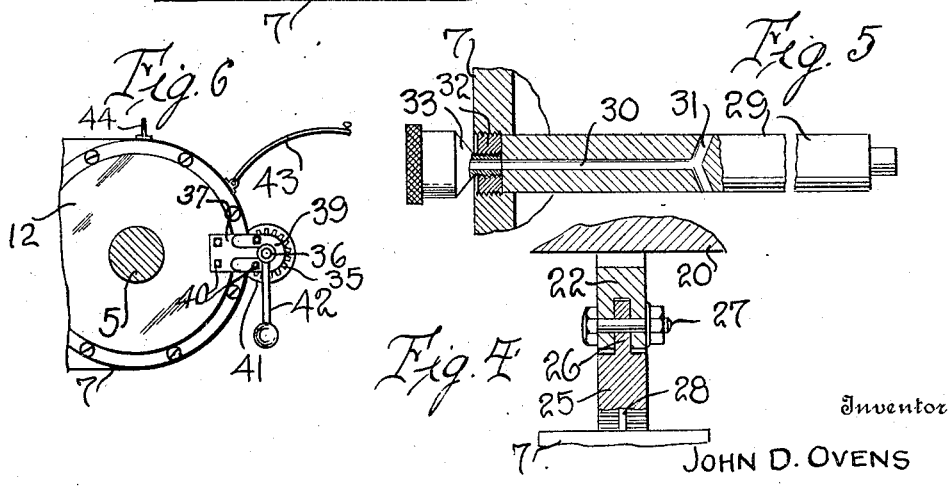
Inventor
JOHN D. OVENS

UNITED STATES PATENT OFFICE.

JOHN D. OVENS, OF GREAT FALLS, MONTANA, ASSIGNOR OF ONE-FOURTH TO MICHAEL WARDINSKY, ONE-FOURTH TO SIDNEY LINDQUIST, AND ONE-FOURTH TO GABRIEL POPOVISCH, ALL OF GREAT FALLS, MONTANA.

SHOCK-ABSORBER FOR VEHICLES.

1,200,756. Specification of Letters Patent. Patented Oct. 10, 1916.

Application filed October 2, 1915. Serial No. 53,791.

*To all whom it may concern:*

Be it known that I, JOHN D. OVENS, a citizen of the United States, residing at Great Falls, in the county of Cascade and State of Montana, have invented certain new and useful Improvements in Shock-Absorbers for Vehicles, of which the following is a specification, reference being had to the accompanying drawings.

This invention relates to an improved shock absorber for vehicles and has for its primary object to provide a simple, effective and durably constructed device whereby all shocks or jars are absorbed when the vehicle wheels strike obstructions or engage in depressions in the roadway so that no discomfort will be occasioned to the occupants of the vehicle.

The invention has for another and more particular object to provide a gear case fixed upon a wheel axle, a spring held gear arranged in the case and revolubly mounted on the axle and a rack bar pivotally connected at one end to the frame of the vehicle body and meshing with said gear.

It is a still further object of the invention to provide an improved mounting and arrangement of the spiral springs within the gear case and means whereby said springs may be easily and quickly connected to or disconnected from said gear at one of their ends.

Figure 1:
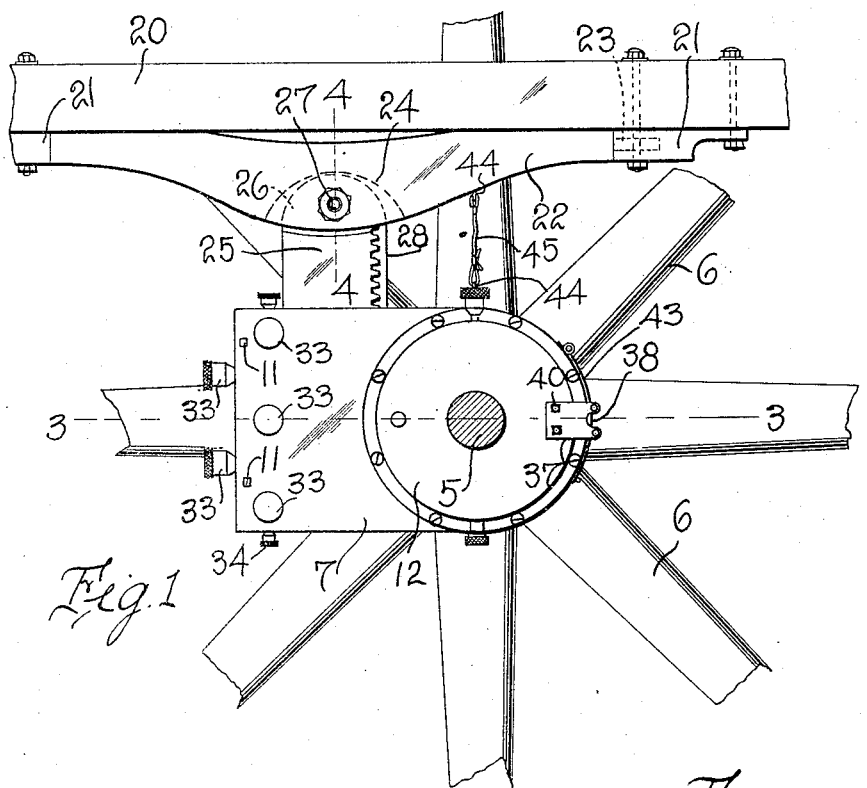
Figure 3:
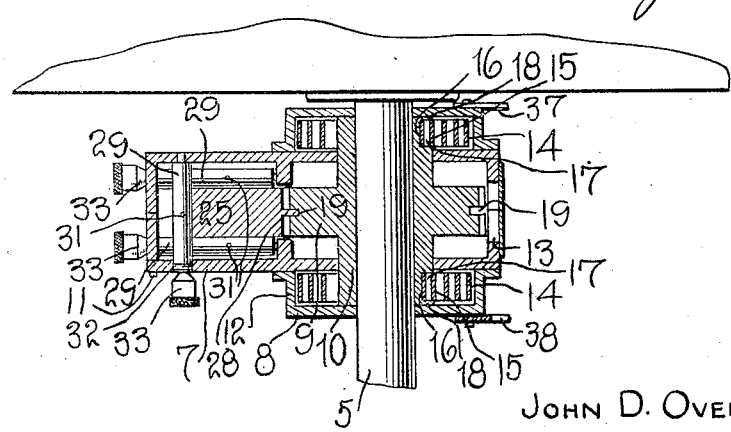

With the above and other objects in view, my invention consists in the novel features of construction, combination and arrangement of parts to be hereinafter more fully described, claimed and illustrated in the accompanying drawings, in which, Figure 1 is an elevation showing my improved shock absorbing device applied to a vehicle; Fig. 2 is an enlarged vertical section, certain of the parts being broken away; Fig. 3 is a horizontal section taken on the line 3—3 of Fig. 1; Fig. 4 is a detail vertical section taken on the line 4—4 of Fig. 1; Fig. 5 is a detail sectional view through one of the bearing and oil feed rollers for the rack bar; and Fig. 6 is a fragmentary detail elevation showing the spring winding device applied to the gear case.

Referring in detail to the drawings, 5 designates the front axle of the vehicle and 6 indicates the wheel which is revolubly mounted upon the end of said axle.

Upon the axle 5, the gear case 7 is rigidly secured in any suitable manner and one side of this gear case is provided with an opening through which access may be had to the interior thereof. This opening is closed by a removable face plate 8. Within the case 7, a gear wheel 9 is arranged and loosely mounted to revolve upon the axle 5. This gear wheel is formed with the oppositely disposed hub extensions 10. The gear case 7 is constructed in two sections which are detachably bolted together, as indicated at 11, and upon the side wall of each case section a spring housing or cover 12 is secured. This case, at one of its ends, is rounded and provided with a rectangular opening 13 for a purpose to be later referred to.

Within each of the housings 12, a spiral leaf spring 14 is arranged. The opposite ends of these springs are turned upon themselves to provide sleeves indicated at 15, and it will be observed that the springs gradually taper or decrease in thickness from one end to the other so that they will have a maximum of resiliency and yet be capable of sustaining considerable tensional pressure without breaking. Each of the hub extensions 10 on the gear 9 is provided in its periphery with a concave longitudinally extending groove or recess 16, and in the sleeves 15 on the inner thicker ends of the spiral leaf springs, pins 17 are engaged, and these sleeves and pins are seated in the recesses 16 of the hub sleeves. The outer ends of the springs are suitably fixed to the walls of the housings 12. Detachable plates 18 are countersunk in the outer end faces of the sleeves 10 to prevent outward shifting movement of the ends of the springs in the grooves 16. The gear 9 is provided with two sets of teeth, separated by a central circumferentially extending groove 19.

To the under side of the body frame 20 of the vehicle, spaced bearing blocks 21 are securely bolted, and in these blocks longitudinally projecting pins 23 on the ends of a bar 22, are engaged. The intermediate portion of this bar is longitudinally curved and is provided in its bottom face with an arcuate recess indicated at 24.

25 designates a rack bar having a reduced end portion 26 engaged in the recess 24 and mounted to rock upon the transversely disposed bolt 27 fixed in the bar 22. This rack bar is also provided upon one of its longitudinal edges with two sets of teeth separated by a longitudinal flange 28. This flange slidingly engages in the circumferential groove 19 of the gear 9, the two sets of teeth on said gear meshing with the corresponding teeth on opposite sides of the flange 28. This flange, it will be seen, holds the teeth in proper meshing engagement and prevents longitudinal shifting movement of the gear upon the wheel axle. The rack bar 25 slides freely through openings in the top and bottom walls of the gear case 7 and this rack bar is guided in its movement by rollers 29 which are arranged upon opposite sides of said rack bar and across its outer vertical edge, said rollers being suitably journaled at their ends in the opposite side walls of the case and in the body wall thereof and the flange 12. Each of the rollers is formed with a longitudinally extending bore 30 and diverging ports 31 at the center of the roller communicating with the inner end of the bore. The outer end of the bore 30 opens upon the outer end face of the roller and a nut 32 is threaded in the opening of the case wall in which the end of the roller is journaled. This nut is provided with a central threaded bore to receive the threaded stem of a lubricant containing cup 33, and the bore of said stem is in alinement with the bore 30 in the roller. Thus, a lubricant may be supplied to the roller 30, said lubricant being discharged from the ports 31 upon the movable rack bar 25 so as to reduce friction and wear of the rack bar to a minimum. The bottom of the gear case is provided with suitable drain cups indicated at 34, whereby the oil or lubricant collecting therein may be removed.

For the purpose of turning the gear 9 and suitably tensioning the springs 14 before the vehicle body is placed in position upon the wheel axles, I provide the detachable pinion 35 having a shaft 36 adapted to be engaged at its ends in bearing recesses 38 formed in the ends of plates 37 which are fixed to the opposite side walls of the gear case 7. Removable U-shaped bearing plates 39 provide the other half of the bearings for the shaft ends, said plates being detachably bolted, as at 40, to the plates 37. The pinion 35 is also pivoted in a similar manner to the gear 9 and has a central annular flange 41 to engage in the circumferential groove 19 of the gear. A suitable crank 42 is adapted to be detachably connected to one end of the shaft 36 whereby said pinion may be rotated. When the spring winding pinion is removed from the gear case, the opening 13 in the case wall may be closed by the hingedly mounted cover plate 43. Metal loops or eyes 44 are secured to the top of the gear case 7 and to the bar 22, and to said loops the ends of a strap 45 are connected. This strap serves to limit the rebound of the vehicle body under the action of the spiral springs 14.

From the above description, taken in connection with the accompanying drawings, it is believed that the construction, manner of operation and several advantages of my invention will be clearly and fully understood. When the vehicle wheels strike an obstruction or move into ruts in the road surface upon the downward movement of the vehicle body with respect to the wheel axle, the rack bar 25, meshing with the gear 9, rotates said gear in the direction indicated by the arrow in Fig. 2, thereby placing the springs 14 under additional tension. These springs returning to their normal condition, reverse the rotation of the gear and cushion the rebound of the vehicle body which, as above stated, is limited by the strap 45. After initially tensioning the spring 14, the shaft 36 and gear 35 are suitably held against rotation until the teeth of the rack 25 are engaged with the teeth of the gear 9. This initial tension is sufficient to sustain the vehicle body in a predetermined normal position with respect to the wheel axles, and as the load increases the spring is further tensioned in the downward movement of the body and the racks connected thereto. Therefore, when the vehicle wheels strike an obstruction and the vehicle body moves downward and increases the tension of the spring beyond the normal load supporting tension, in the rebound or upward movement of the vehicle body the spring will immediately uncoil until it again reaches the point of its normal maximum tension. Any tendency of the spring to further uncoil and force the vehicle body upwardly is counteracted by the load pressure so that there will be a succession of vertical movements of the vehicle body which are cushioned in the alternate coiling and uncoiling of the spring. It will be seen that by first tensioning the spring somewhat before the body is placed in position, the distance between the vehicle body and the wheel axles, when the spring is under normal load tension, may be adjusted in accordance with the load capacity of the vehicle, so that the rack 25 will never become disengaged from the gear 9, even though the strap connections 45 might break or become accidentally detached. In this manner, it will be apparent that all shocks and jars to the vehicle axle are absorbed and are not transmitted to the body of the vehicle.

It will be understood that the shock absorbing devices are mounted upon the opposite ends of the axle and are also provided upon the ends of the case for the rear wheel axle.

The device, while comparatively simple in its construction, is highly reliable and efficient for the intended purpose.

The invention can also be readily applied to the ordinary motor vehicle without necessitating any material alterations therein.

While I have shown and described the preferred construction and arrangement of the several elements employed, it is to be understood that the device is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

1. The combination with a vehicle body and supporting axle therefor, of a gear case fixed upon the axle, a gear loosely mounted upon said axle within the case and having a central circumferentially extending groove dividing the teeth thereof, springs arranged within the case and normally holding the gear yieldingly against rotation in one direction, and a rack bar connected at one end to the frame of the vehicle body and movable through the case in meshing engagement with said gear, said bar having a flange thereon slidably engaged in the circumferential groove of the gear.

2. The combination with a vehicle body and supporting axle therefor, of a gear loosely mounted upon said axle, springs yieldingly holding the gear against rotation in one direction, a rack bar connected to the frame of the vehicle body and meshing with said gear, and co-engaged means on the gear and said rack bar whereby the gear is held against longitudinal shifting movement on the axle with respect to the rack bar.

3. The combination with a vehicle body and supporting axle therefor, of a gear loosely mounted upon the axle, springs yieldingly holding the gear against rotation on the axle in one direction, a rack bar pivotally connected at one of its ends to the frame of the vehicle body and meshing with said gear, and a flange on the rack bar coöperatively engaged with the gear to hold the latter against longitudinal shifting movement upon the vehicle axle.

4. The combination with a vehicle body and supporting axle therefor, of a case fixed upon said axle, a gear loosely mounted upon the axle within said case, said gear having hub extensions mounted in the side walls of the case, spiral springs arranged exteriorly of the case and connected to the hub extensions of the gear to yieldingly hold the same against rotation, housings for said springs fixed upon the case walls, and a rack bar pivotally connected to the frame of the vehicle body and movable through said case in meshing engagement with the gear.

5. The combination with a vehicle body and supporting axle therefor, of a gear case fixed upon said axle and having an opening in its wall, a gear loosely mounted upon the axle within said case, springs connected to the gear to yieldingly hold the same against rotation on the axle, a vertically movable rack bar pivotally connected to the frame of the vehicle body and movable through the case in meshing engagement with said gear, and a pinion adapted to be detachably mounted upon the case to extend through said opening and mesh with the gear whereby the gear may be rotated to tension said springs.

In testimony whereof I hereunto affix my signature in the presence of two witnesses.

JOHN D. OVENS.

Witnesses:
W. F. O'LEARY,
A. SOSNICK.

Copies of this patent may be obtained for five cents each, by addressing the "Commissioner of Patents, Washington, D. C."